United States Patent
Chen et al.

(10) Patent No.: US 12,526,463 B2
(45) Date of Patent: Jan. 13, 2026

(54) BITRATE SELECTION USING STORED INFORMATION

(71) Applicant: Beijing YoJaJa Software Technology Development Co., Ltd., Beijing (CN)

(72) Inventors: Si Chen, Beijing (CN); Tongyu Dai, Beijing (CN); Lemei Huang, Beijing (CN)

(73) Assignee: Beijing Yo.JaJa Software Technology Development Co., Ltd., Beijing (CN)

( * ) Notice: Subject to any disclaimer, the term of this patent is extended or adjusted under 35 U.S.C. 154(b) by 0 days.

(21) Appl. No.: 18/435,925

(22) Filed: Feb. 7, 2024

(65) Prior Publication Data

US 2025/0168436 A1    May 22, 2025

Related U.S. Application Data

(60) Provisional application No. 63/600,013, filed on Nov. 16, 2023.

(51) Int. Cl.
*H04N 21/2662* (2011.01)
*H04L 43/0829* (2022.01)
*H04N 21/24* (2011.01)

(52) U.S. Cl.
CPC ..... *H04N 21/2662* (2013.01); *H04L 43/0841* (2013.01); *H04N 21/2402* (2013.01)

(58) Field of Classification Search
CPC .......... H04N 21/2662; H04N 21/2402; H04N 21/23439; H04N 21/23106; H04N 21/23805; H04N 21/26216; H04L 43/0841; H04L 67/303; H04L 67/06
See application file for complete search history.

(56) References Cited

U.S. PATENT DOCUMENTS

| 9,407,968 | B2 * | 8/2016 | Hao | H04N 21/6405 |
| 10,958,947 | B1 * | 3/2021 | Wei | H04N 21/236 |
| 11,616,993 | B1 * | 3/2023 | Chen | H04N 21/23439 725/146 |
| 11,812,081 | B2 * | 11/2023 | Dai | G06N 3/08 |
| 12,192,541 | B2 * | 1/2025 | Tocalini | H04N 21/2335 |
| 2014/0156863 | A1 | 6/2014 | Gao et al. | |

(Continued)

FOREIGN PATENT DOCUMENTS

| EP | 4311242 A1 * | 1/2024 | ......... H04N 21/2662 |
| JP | 2015133701 A | 7/2015 | |

(Continued)

OTHER PUBLICATIONS

U.S. Appl. No. 19/039,679, filed Jan. 2025.

(Continued)

*Primary Examiner* — Oanh Duong
(74) *Attorney, Agent, or Firm* — Kwan & Olynick LLP

(57) ABSTRACT

In some embodiments, a method determines whether to use first logic or second logic to select a profile from a list of profiles to download a segment of content. When using the second logic: selecting historical information from one or more previous playback sessions; determining a bandwidth using the historical information; and selecting the profile using a bitrate that is determined based on the bandwidth. When using the first logic, selecting the profile without using the historical information.

21 Claims, 7 Drawing Sheets

(56) References Cited

U.S. PATENT DOCUMENTS

| | | | |
|---|---|---|---|
| 2014/0247742 A1* | 9/2014 | Lee | H04W 24/10 |
| | | | 370/252 |
| 2020/0099733 A1* | 3/2020 | Chu | H04N 21/2402 |
| 2021/0144080 A1 | 5/2021 | Ni et al. | |
| 2022/0159268 A1* | 5/2022 | Liu | H04N 21/23418 |
| 2022/0182685 A1 | 6/2022 | Dai et al. | |
| 2023/0224351 A1* | 7/2023 | Mamidwar | H04L 65/61 |
| | | | 709/219 |
| 2024/0031629 A1* | 1/2024 | Pejhan | H04N 21/23655 |

FOREIGN PATENT DOCUMENTS

| | | |
|---|---|---|
| JP | 2017157904 A | 9/2017 |
| JP | 2022119167 A | 8/2022 |
| JP | 2023063238 A | 5/2023 |
| JP | 2025082259 A | 5/2025 |

OTHER PUBLICATIONS

Extended European Search Report, European Patent Application 24200919.9, mailed Feb. 26, 2025, 11 pages.
Office Action, Japanese Patent Application No. 2024-168372, Japan Patent Office, mailed Nov. 4, 2025.

\* cited by examiner

BITRATE SELECTION USING STORED INFORMATION

CROSS REFERENCE TO RELATED APPLICATIONS

Pursuant to 35 U.S.C. § 119 (e), this application is entitled to and claims the benefit of the filing date of U.S. Provisional App. No. 63/600,013 filed Nov. 16, 2023, entitled "INITIAL BITRATE SELECTION USING STORED INFORMATION", the content of which is incorporated herein by reference in its entirety for all purposes.

BACKGROUND

In the domain of video streaming, adaptive bitrate streaming technologies have become pivotal in ensuring a seamless and high-quality viewing experience for end-users. These technologies dynamically adjust the quality of the video stream based on the viewer's available network bandwidth and device capabilities, thereby optimizing playback performance. However, existing adaptive streaming solutions often encounter challenges in providing an optimal streaming experience. This leads to suboptimal streaming experiences characterized by buffering issues, lower-than-expected video quality, and potentially diminished user satisfaction.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

An adaptive bitrate algorithm may determine a profile level to select based on available bitrate in a playback session. The adaptive bitrate algorithm may determine the bitrate, and select a profile based on bitrate. For example, the profile that is associated with a bitrate that is closest to the determined bitrate may be selected. At times, such as for the initial segment of content, the adaptive bitrate algorithm may use first logic to select a profile that may not consider bandwidth, such as because this is the first segment of the playback session and there is no available bandwidth in the playback session for the adaptive bitrate algorithm to consider. In some examples, the first logic may select a first profile in a list of profiles that is received from a content delivery network. The first profile may be associated with a first bitrate. In some cases, the first profile may not be the optimal profile to use. For example, the first bitrate may be higher than the current available bandwidth that is experienced when downloading the initial segment, which may result in slower download times and a slower startup time for playback.

To improve the playback, the adaptive bitrate algorithm may use second logic to select a profile instead of the first logic. The second logic may use historical information to determine a bitrate that is used to select a profile. The profile that is selected may improve the playback experience. For example, if historical information indicates that bandwidth may be lower in previous playback sessions, the adaptive bitrate algorithm may determine that the bitrate is 500K megabits per second (Mbps). However, the first profile may be associated with a bitrate of 2400K Mbps. The adaptive bitrate algorithm may select the profile with a bitrate of 400K Mbps. The use of the profile with 400K Mbps may improve the download process of the first segment and start playback faster. In other examples, if more bandwidth is available, a profile with a higher bitrate may be selected to more efficiently use available bandwidth, such as a profile with 3000K Mbps is selected if the bandwidth is 3500K Mbps.

System

Figure 1:
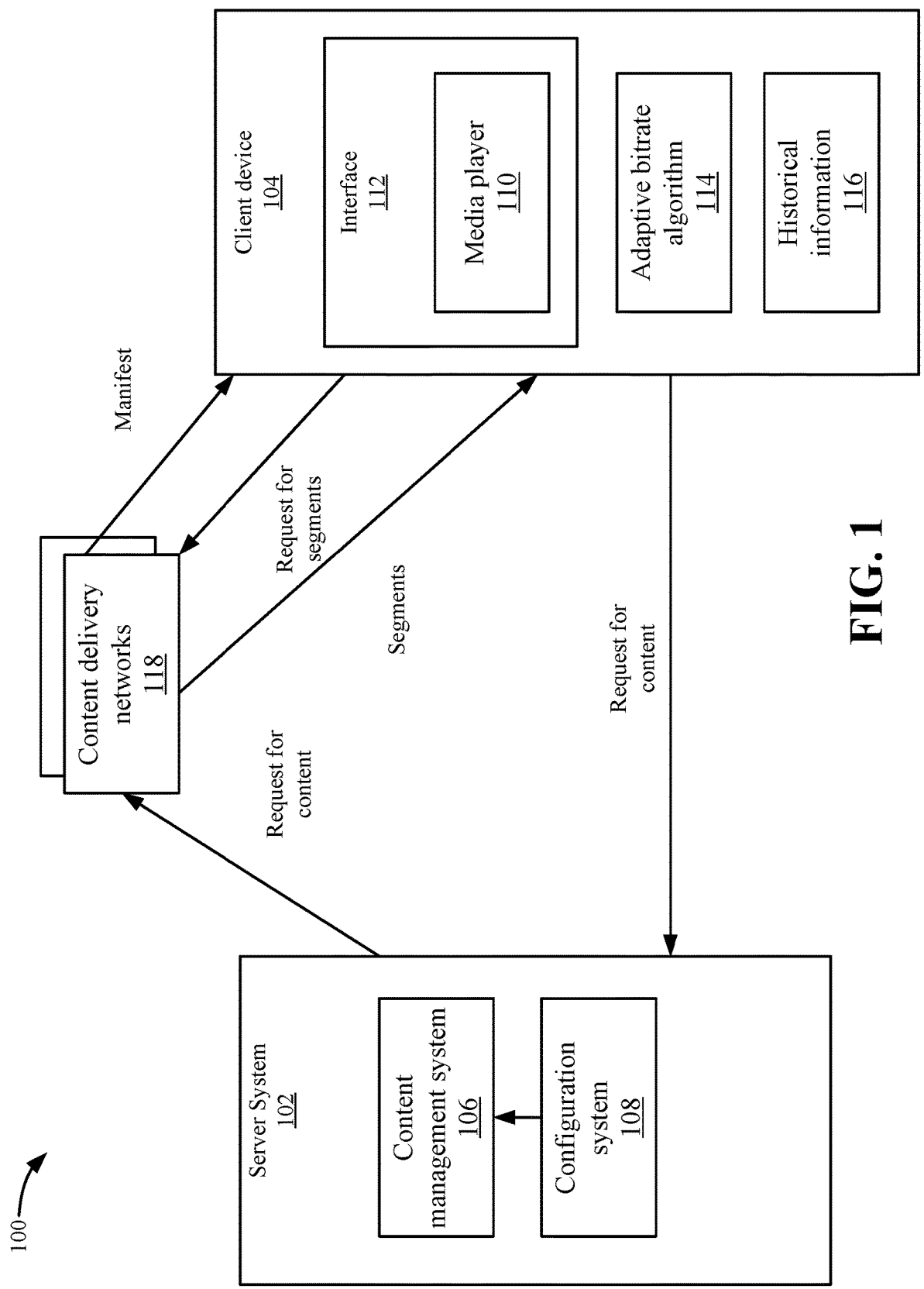
FIG. 1 depicts a simplified system performing an adaptive bitrate algorithm that uses different logic according to some embodiments.

FIG. 1 depicts a simplified system 100 performing an adaptive bitrate algorithm that uses different logic according to some embodiments. System 100 includes a server system 102 and a client device 104. Although single instances of server system 102 and client device 104 are shown, multiple instances of server system 102 and client device 104 may be appreciated. For example, multiple client devices 104 may be requesting content from a single server system 102 or multiple server systems 102.

Server system 102 includes a content management system 106 that may facilitate the delivery of content to client device 104. For example, content management system 106 may communicate with multiple content delivery networks 118 (also referred to as a content delivery network 118) to have content delivered to multiple client devices 104. A content delivery network 118 includes servers that can deliver content to client device 104. The content may be video, audio, or other types of content. Video may be used for discussion purposes, but other types of content may be used in place of video. In some embodiments, content delivery network 118 delivers segments of video to client device 104. The segments may be a portion of the video, such as six seconds of the video. A video may be encoded in multiple profile levels that correspond to different levels, which may be different levels of bitrates or quality (e.g., resolution). Client device 104 may request a segment of video from one of the profile levels based on current network conditions. For example, client device 104 may use an adaptive bitrate algorithm to select the profile level for the video based on the estimated current available bandwidth and other network conditions.

Client device 104 may include a mobile phone, smartphone, set top box, television, living room device, tablet device, or other computing device. Client device 104 may include a media player 110 that is displayed on an interface 112. Media player 110 or client device 104 may request content from the content delivery network 118.

A profile ladder may be provided to client device 104 for segments that can be requested in a manifest. A manifest may be a playlist or media presentation description that lists information for segments that can be requested. The information may include a profile ladder. The profile ladder may list different profile levels for each segment. The profile levels may be associated with different bitrates, quality, or both, and other information such as segment duration, encoder type, etc. The different bitrates, quality, or both may have been used to encode each segment of the video to create multiple profiles for each segment. An adaptive bitrate algorithm 114 may determine which profile level to select for each segment. Client device 104 can send requests for segments that are associated with a profile level. For example, client device 104 may use identifying information for a profile level to request a segment. Content delivery network 118 may then send the segment of video for the requested profile level to client device 104, which can then display the segment in media player 110 on interface 112. Client device 104 may change the profile levels that are requested for segments based on current network conditions.

A configuration system 108 may provide configuration settings for client device 104. For example, the configuration settings may be settings for adaptive bitrate algorithm 114. Different settings will be discussed below at least in FIG. 3 in more detail.

Historical information 116 may be information from previous playback sessions of client device 104. For example, client device 104 may have played back instances of content from content management system 106 on media player 110. Historical information 116 may include metrics from the playback sessions. Also, historical information 116 may include information from previous playback sessions of other client devices, such as averages from other client devices may be integrated with information from this client device 104.

In some embodiments, network related metrics and quality of service metrics may be stored in historical information 116. Network related metrics may be based on the delivery of content, such as bandwidth and round trip time. Quality of service information may be based on the quality of service experienced, such as whether rebuffers or failures occurred during playback sessions. Other information may also be included, but is not limited to, in historical information 116, such as information regarding the content delivery network that was used, network mode, and decoding capacity. Network mode may be the mode that was used to deliver the content, such as protocol. The decoding capacity may be based on the ability to decode content, such as based on computing resources of client device 104. Also, the decoding capability may indicate which videos can be decoded, such as client device 104 may not be able to decode videos with 60 frames per second.

Historical information 116 may store information for a number of sessions, such as the number of sessions in the last day, week, month, etc. Historical information 116 may be stored locally in client device 104. For example, historical information 116 may be stored in memory that is allocated to an application for media player 110. The storing of historical information 116 locally in client device 104 may improve the operation of client device 104. For example, historical information 116 may be accessible quicker when adaptive bitrate algorithm 114 requires the use of historical information 116. Also, less storage may be used at server system 102 or elsewhere if historical information 116 is stored at client device 104. For example, content management system 106 may be interacting with a large number of client devices and would have to store historical information 116 for each client device. Also, if historical information 116 is stored externally, indexing with references to which client device 104 the historical information is associated may be needed. However, in other embodiments, historical information 116 may be stored externally and accessed by client device 104. The historically stored historical information 116 may be indexed by client device and accessed by respective client devices when required. Examples of historical information 116 will be described in more detail below at least in FIG. 3.

Adaptive bitrate algorithm 114 may use historical information 116 to improve its selection of bitrates. When adaptive bitrate algorithm 114 is determining a bitrate, such as the initial bitrate to be used to request a profile in a playback session, adaptive bitrate algorithm 114 may select the bitrate using different sets of logic. For example, first logic may be default logic that may select a bitrate that is used to select a profile. In some embodiments, this results in selecting a first profile that is listed in the manifest. In other embodiments, the first logic may use fixed settings or information that are not changed across instances of content that are being played back in different playback sessions. In contrast, adaptive bitrate algorithm 114 may also use second logic that may leverage historical information 116 to select the bitrate. The second logic may adjust the bitrate that is determined based on the values of historical information 116.

The use of historical information may improve the operation of adaptive bitrate algorithm 114. For example, if the first logic selects a first profile by default, such as a profile at 2400K Mbps, but the available bandwidth is only 800K Mbps, client device 104 may experience slow download times because the available bandwidth is less than the bitrate of the profile. Using the second logic, adaptive bitrate algorithm 114 may determine that the bandwidth may be lower based on historical information 116, and a profile around 400K Mbps should be requested. Adaptive bitrate algorithm 114 may select the profile with a bitrate of 400K Mbps, and segments for this profile may be downloaded without experiencing quality of service problems, such as rebuffers, which improves the playback process.

The following will discuss an example where historical information is used for initial profile selection. Although the selection of the initial profile discussed, the following may be used to determine a bitrate at different times, such as after the initial profile selection to select a profile for another segment of the content. The use of historical information may improve the bitrate that is determined to select a segment. Also, historical information 116 may be used to select a bitrate for other applications. For example, the bitrate may be used to adjust parameters for the adaptive bitrate algorithm, such as the parameters may be adjusted in the adaptive bitrate algorithm throughout a playback session based on historical information 116. The parameters may be settings that are used to determine the profile to select, such as a safe factor that applies an adjustment to the determined bitrate. Also, the selection of a content delivery network, or switching between content delivery networks, may use historical information 116 to determine a bitrate.

The following will now discuss the determination of the bitrate in more detail.

Bitrate Selection

Figure 2:
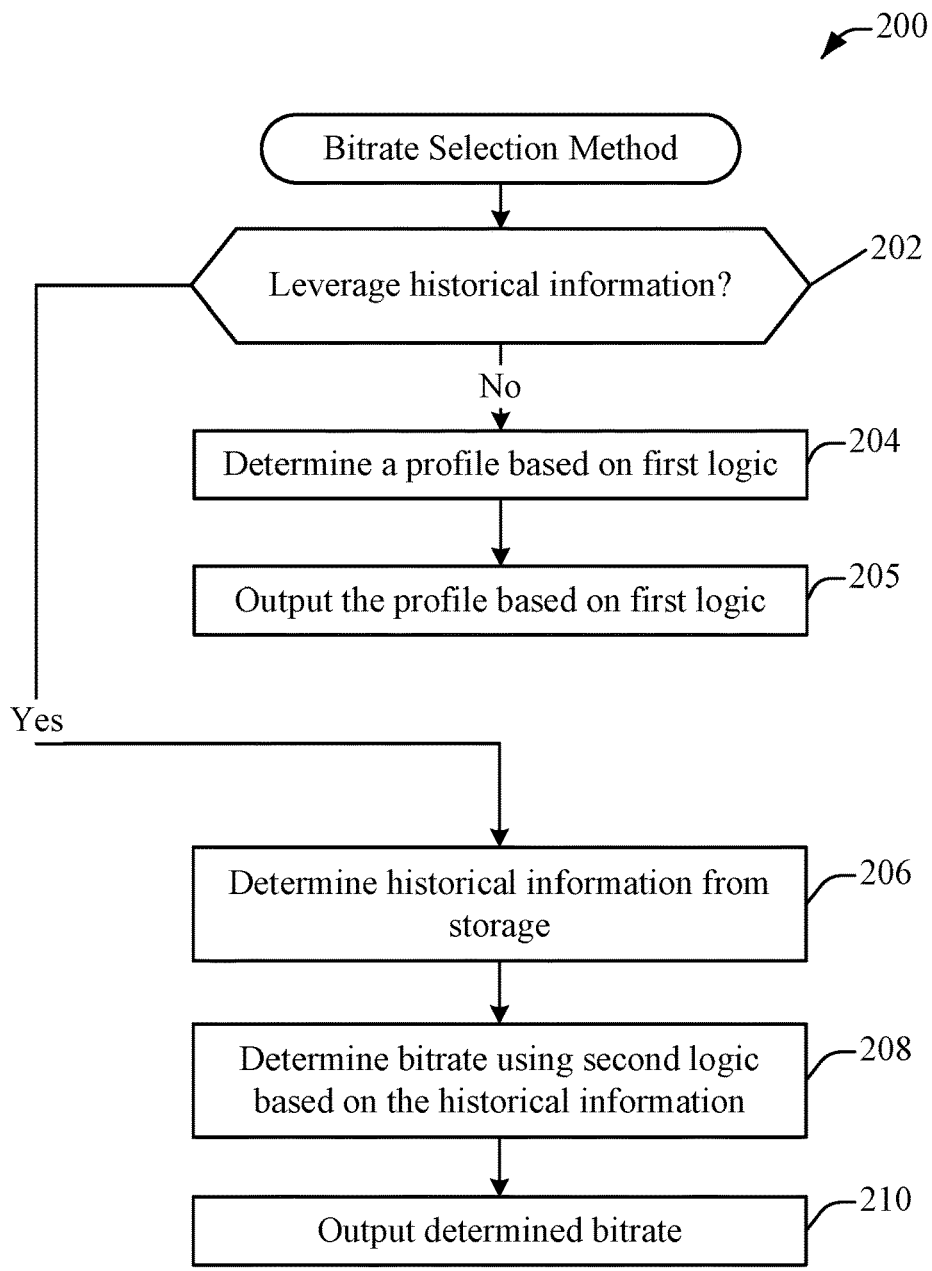
FIG. 2 depicts simplified flowchart for a method for selecting a bitrate according to some embodiments.

FIG. 2 depicts simplified flowchart 200 for a method for selecting a bitrate according to some embodiments. At 202, adaptive bitrate algorithm 114 determines whether to leverage historical information 116. The determination on whether to leverage historical information 116 may be based on different processes. For example, configuration system 108 may provide a setting to client device 104 that is used to determine whether to leverage historical information 116, such as a flag that is set when historical information 116 should be used. Also, client device 104 may analyze historical information 116 to determine whether to leverage historical information 116 based on a context of historical information 116. For example, client device 104 may determine if historical information 116 has expired or not as the context. In some embodiments, historical information 116 may be leveraged when it includes historical information from a time period within a threshold, such as within a day, week, etc. In some examples, if historical information 116 is from playback sessions that were from a longer time ago, such as a week ago, then the historical information may not be accurate. However, if historical information 116 is from the last hour or last day, the historical information may be more accurate, and can be used. Client device 104 may also analyze the values of historical information 116 to determine whether historical information 116 should be leveraged or not. For example, if a percentage of values of historical information 116 are within a range, the historical information 116 may be used because these values may be representative of the current conditions. However, if a large range of values exist, then the historical information may not be accurate because conditions have been changing. In some embodiments, a combination of the above processes may be used, such as the setting may indicate whether to leverage historical information 116 and client device 104 determines whether the information has expired or not.

At 204, adaptive bitrate algorithm 114 determines a profile based on first logic. As discussed above, the first logic may use logic that is fixed, such as logic that always selects a profile that is listed first in a listing of the profiles. That is, client device 104 may receive a manifest from content delivery network 118 that includes information to request segments of content. The manifest may list profiles in an order. Adaptive bitrate algorithm 114 may select a bitrate from the first profile that is listed. In other embodiments, adaptive bitrate algorithm 114 may use to fixed settings to determine a bitrate, such as by calculating a bitrate based on its configuration settings. The first logic may not consider any historical information from previous playback sessions. At 205, adaptive bitrate algorithm 114 outputs the determined profile. The first logic may also make other determinations, such as determined a bitrate using fixed logic, such as determining the first bitrate associated with the first profile in the list.

If historical information 116 is to be leveraged, at 206, adaptive bitrate algorithm 114 determines historical information 116 from storage. In some embodiments, client device 104 retrieves historical information from local storage at client device 104. For example, adaptive bitrate algorithm 114 may submit a query to local storage to retrieve historical information 116. A portion of historical information may be retrieved, such as adaptive bitrate algorithm 114 may query for the last hour, last day, the last week of historical information 116, etc.

At 208, adaptive bitrate algorithm 114 determines a bitrate using second logic based on the historical information 116. The second logic may determine different values for the bitrate based on different values of historical information 116. This may adapt the bitrate based on the conditions that have been experienced in historical information 116. The determined bitrate may be more optimal based on the historical conditions that have been experienced by client device 104. The use of the second logic will be described in more detail in FIG. 3 and FIG. 4.

At 210, adaptive bitrate algorithm 114 outputs the determined bitrate. In this case, the profile may have been determined based on the first logic and a bitrate is determined by the second logic. As will be described below in FIG. 5, this may result in different profiles that could be selected.

The determination of historical information that is used in the second logic will now be described.

Historical Information

Historical information 116 may include different parameters in which values are collected from previous playback sessions. The values that are collected may be stored locally in client device 104. Table I depicts an example of historical information 116, but other historical information may be used.

TABLE I

| Category | Information | Description |
| --- | --- | --- |
| Network | LAST observed bandwidth | the observed download bandwidth of the last segment in the previous session |
| | RECENT observed bandwidth | the time-averaged download bandwidth of the last <WINDOW_SIZE> seconds in the previous session |
| | Variance of the RECENT observed bandwidth | the variance of the download bandwidth of the last <WINDOW_SIZE> seconds in the previous session |
| | RECENT observed RTT | the time-averaged round trip time (RTT) of the last <WINDOW_SIZE> seconds in the previous session |
| | Variance of the RECENT observed RTT | the variance of the RTT of the last <WINDOW_SIZE> seconds in the previous session |
| | ESTIMATED bandwidth | the final estimated bandwidth when the previous session ends |
| | ESTIMATED RTT | the final estimated RTT when the previous session ends |
| Qos | isRebuffer | whether the previous session ends with rebuffering |

In some embodiments, historical information 116 may include categories, such as network information, quality of service information, and other information, but other categories may be appreciated. Network information may be based on the delivery of content, such as the delivery of video. The parameters may include information for bandwidth and round trip time. Bandwidth may be based on how much data is downloaded from the network over time. Roundtrip time may be based on how long a communication from client device 104 to content delivery network 118, and back takes, or vice versa.

The following are examples of network information, but other parameters may be appreciated. A last observed bandwidth may be the observed download bandwidth of the last segment in the previous session. The last segment may be described, but the last one or more segments may be used in any of the parameters. Also, the previous session may be described, but previous one or more sessions may be used in any of the parameters. A recent observed bandwidth may be a time average download bandwidth of the last <window_size> seconds in the previous session. Window size may be a set value, such as 10 seconds, 60 seconds, X seconds, Y minutes, etc. The variance of the recent observed bandwidth may be the variance of the download bandwidth of the last <window_size> seconds in the previous session. A recent observed roundtrip time may be the average roundtrip time of the last <window_size> seconds in the previous session. A variance of the recent observed roundtrip time may be the variance of the roundtrip time of the last <window_size> seconds in the previous session. The estimated bandwidth may be the final estimated bandwidth when the previous session ends. The estimated roundtrip time may be the final estimated roundtrip time when the previous session ends.

For quality of service information, the isRebuffer parameter may indicate whether the previous session ends with or included a rebuffering. A rebuffering is when playback is interrupted due to insufficient data in the buffer to support the playback rate. A rebuffer may indicate that there was inadequate bandwidth to support the downloading of video to support playback at a playback rate.

Other information may include other parameters, such as an isStarted parameter that indicates whether the previous session has started, such as rendered the first frame. The previous session may not start if a failure occurs. Also, an isLive parameter may be true if the previous session is a live session. Otherwise, the previous session may be a video-on-demand session.

Figure 3:
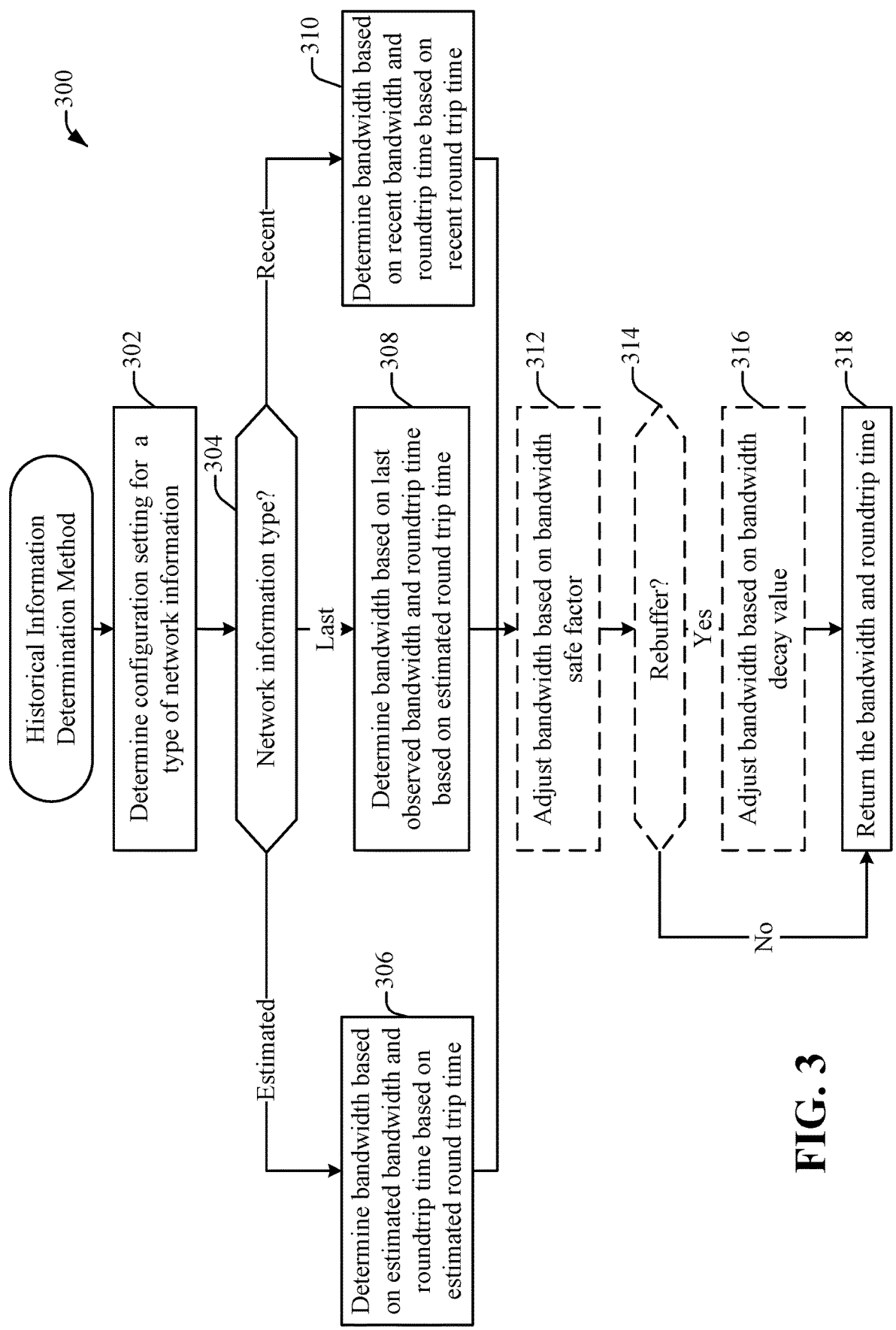
FIG. 3 depicts a simplified flowchart for determining historical information according to some embodiments.

The second logic may use some or all of the above parameters to determine the bandwidth and roundtrip time. The second logic then uses the bandwidth and the roundtrip time to determine the bitrate that is used to select a profile. FIG. 3 depicts a simplified flowchart 300 for determining historical information 116 according to some embodiments. At 302, adaptive bitrate algorithm 114 determines a configuration setting for a type of network information. The configuration setting may be based on a setting that is received from configuration system 108. Alternatively, client device 104 may set the configuration setting. In some embodiments, client device 104 may analyze playback sessions to determine which type of network information may provide more accurate predictions of bitrate. For example, client device 104 may select different network information and analyze feedback on performance of the playback session. Also, content management system 106 may perform a similar analysis.

At 304, adaptive bitrate algorithm 114 determines which network information type to use. For example, the configuration settings may indicate estimated type, last type, or recent type should be used. In some embodiments, adaptive bitrate algorithm 114 may compare values of the last observed bandwidth, the recent observed bandwidth, and the estimated bandwidth to thresholds to determine which performance predicted the optimal bitrate, and the types may be ranked. For example, the type that is selected may be the network information type that has historically resulted in the highest ranked performance in playback sessions.

At 306, if the estimated type is used, adaptive bitrate algorithm 114 determines a bandwidth based on the estimated bandwidth and a roundtrip time based on the estimated roundtrip time. The estimated bandwidth and the estimated roundtrip time may be the final estimated bandwidth and the final estimated roundtrip time when the previous session ends.

At 308, if the last type is selected, adaptive bitrate algorithm 114 determines a bandwidth based on the last observed bandwidth and a roundtrip time based on an estimated roundtrip time. The last observed bandwidth may be the bandwidth of the last segment in the previous session. The estimated roundtrip time may be the final estimated roundtrip time when the previous session ends. Although the estimated roundtrip time is used, other roundtrip times may be used, such as a last roundtrip time from the previous session.

At 310, if the recent type is selected, adaptive bitrate algorithm 114 determines the bandwidth based on the recent observed bandwidth and the roundtrip time based on the recent observed roundtrip time. The recent observed bandwidth may be the time averaged download bandwidth of the last <window_size> seconds in the previous session. The recent observed roundtrip time may be the time average roundtrip time of the last <window_size> seconds in the previous session.

In an optional step at 312, adaptive bitrate algorithm 114 may adjust the bandwidth based on a bandwidth safe factor. The bandwidth safe factor may be a value that may adjust the bandwidth to an amount that may allow for variations in bandwidth to not affect playback. The bandwidth safe factor may be used to determine a portion of the bandwidth to use, which can be adjusted to control the conservativeness in terms of the bandwidth that is determined. For example, the bandwidth safe factor may adjust the bandwidth to a lower number such that adaptive bitrate algorithm 114 may assume that the available bandwidth being experienced was lower. This allows for a lower bandwidth to be experienced without causing playback issues.

In another optional step, at 314, adaptive bitrate algorithm 114 determines if a rebuffer occurred. For example, adaptive bitrate algorithm 114 may use the parameter value isRebuffer to determine whether a previous session ends with ended with rebuffering. Although the previous session is described, other thresholds may be used, such as a percentage of rebufferings that occur in the last X sessions may also be used. If a rebuffer occurred, at 316, adaptive bitrate algorithm 114 may adjust the bandwidth based on a bandwidth decay value. The bandwidth decay value may reduce the bandwidth to avoid rebuffering in a new playback session. For example, a bandwidth decay may be continuously applied where the decay value may increase if rebuffering continues to occur over multiple sessions. The higher bandwidth decay value may reduce the bandwidth more.

At 318, adaptive bitrate algorithm 114 returns the bandwidth and the roundtrip time that is determined. Once determining the bandwidth and roundtrip time, the second logic may determine the bitrate to use to select the profile.

Bitrate Determination

Figure 4:
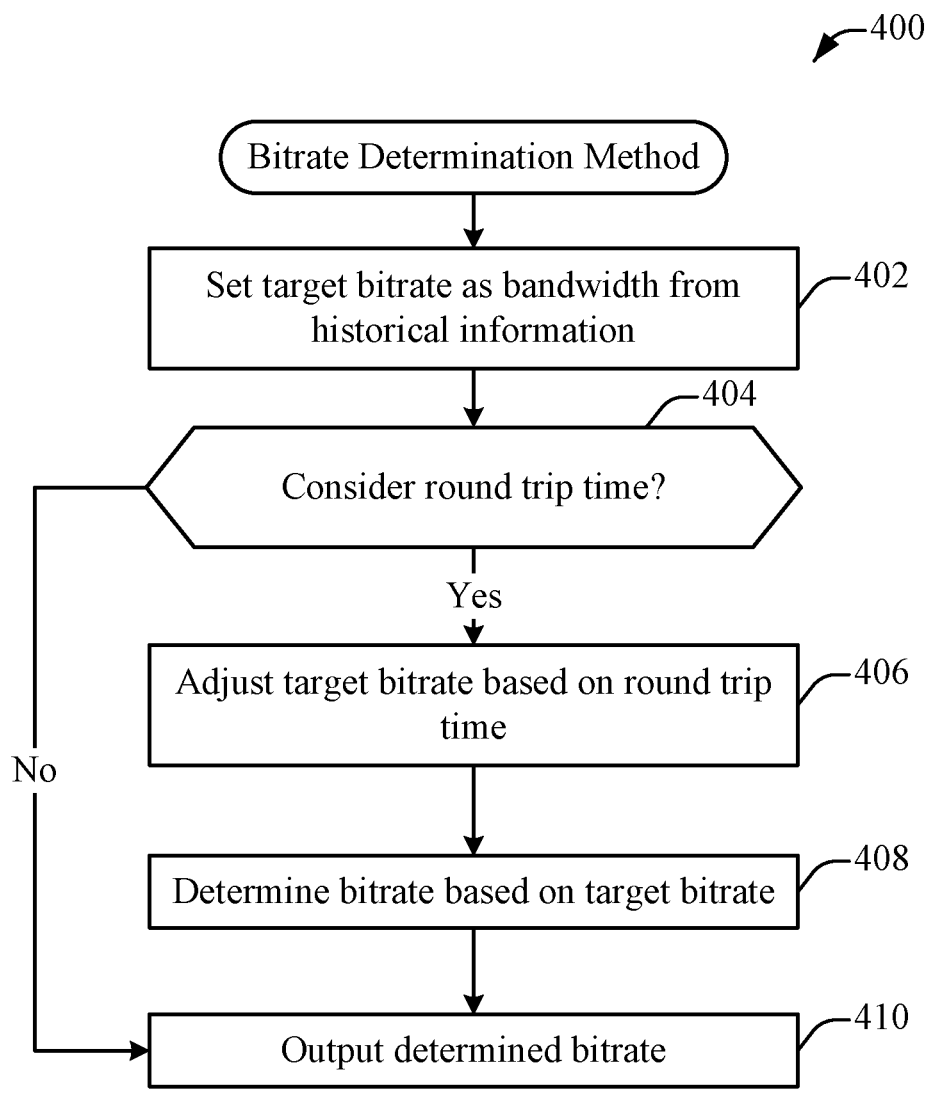
FIG. 4 depicts a simplified flowchart of a method for determining the bitrate using the second logic according to some embodiments.

FIG. 4 depicts a simplified flowchart 400 of a method for determining the bitrate using the second logic according to some embodiments. At 402, adaptive bitrate algorithm 114 sets a target bitrate as the bandwidth that was determined from historical information in FIG. 3. The bandwidth may have been determined from different types of historical information 116 as described in FIG. 3.

At 404, adaptive bitrate algorithm 114 determines whether to consider roundtrip time. Adaptive bitrate algorithm 114 may use a configuration setting to determine whether roundtrip time should be considered. When downloading a segment, a roundtrip time of communications may be required before downloading the segment. The roundtrip time may be considered in applications where roundtrip time may impact the quality of experience, such as satellite networks may have long roundtrip times, but a local area network may have low roundtrip times, and roundtrip time may not be considered.

At 406, adaptive bitrate algorithm 114 adjusts the target bitrate based on roundtrip time. The target bitrate may be adjusted using different methods. For example, the value of the roundtrip time may determine how much the target bitrate is adjusted. If the roundtrip time is longer, then the target bitrate may be reduced to a first amount. If the roundtrip time is smaller, then the target bitrate may not be reduced as much as the first amount. The reasoning is that roundtrip time may indicate how long a communication takes from client device 104 to content delivery network 118, and back. Some roundtrip communications may be required during the playback session and the communications may delay the downloading of segments of video. In a longer roundtrip time delay, less data may be stored in the buffer and the chance of rebuffering occurring may increase. Thus, longer roundtrip times may require that the target bitrate be lowered. For example, if bandwidth is 1000 kbps and target duration (e.g., segment duration) is 5 s, when roundtrip time is 0.1 s, the target bitrate will be 980 kbps. If roundtrip time is 3 s, the target bitrate will be 400 kbps. In some examples, the following may be used to determine the adjustment to the target bitrate, which uses the roundtrip time as a multiplying factor to reduce the target bitrate:

$$\text{target bitrate} = (\text{target duration}(5\ s) - RTT(0.3\ s))/\text{Target duration}(5\ s)) *$$

$$\text{bandwidth} = (1 - RTT/\text{target duration}) * \text{bandwidth}.$$

In the above, target duration (e.g., 5 seconds) may be based on the duration of a segment (e.g., a value less than segment duration). When RTT is considered, the above requires that the download time of a segment+RTT associated with a segment (e.g., 0.3 seconds) should be smaller than the segment duration, and thus the target bitrate should be further reduced by multiplying by the factor.

At 408, adaptive bitrate algorithm 114 determines the bitrate based on the target bitrate. The determined bitrate may be reduced compared to the target bitrate. In some embodiments, adaptive bitrate algorithm 114 can use two types of logic to decide on the final download bitrate. For example, the server-side provides with segments with profiles {1200 kbps, 1800 kbps, 2000 kbps} and the target bitrate is 1950 kbps. If the profile has a bitrate "less than" the target bitrate, adaptive bitrate algorithm 114 selects the profile with the bitrate of 1800 kbps, which is the bitrate less than the target bitrate that is closest to the target bitrate without being greater than the target bitrate. If the profile should be "more close to", adaptive bitrate algorithm 114 selects the profile with the bitrate of 2000 kbps, which is the closest bitrate to the target bitrate without considering if the bitrate is less than or greater than the target bitrate.

At 410, adaptive bitrate algorithm 114 outputs the determined bitrate. The determined bitrate may then be used to select a profile.

Profile Selection

Figure 5:
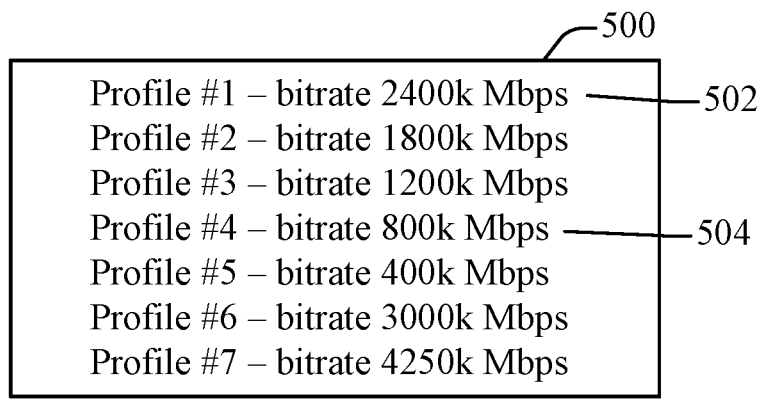
FIG. 5 depicts an example of profiles in a manifest according to some embodiments.

FIG. 5 depicts an example of profiles 500 in a manifest according to some embodiments. Profiles 500 may include a list of seven profiles of Profile #1 to Profile #7. Although these profiles are listed, the number of profiles may be different. Each profile may be listed with an associated bitrate. The bitrate listed may be the bitrate in which the segments of video are encoded. It is noted that each profile may include additional information in the manifest, such as quality, segment duration, etc., but is not shown. The list may be in order, where Profile #1 is listed first, Profile #2 is listed second, and so on.

At 502, the first logic may select the profile that is listed first in the manifest, which is Profile #1, and has a bitrate of 2400k Mbps. At 504, the second logic may select profile #4, which has a bitrate of 800k Mbps. The lower bitrate may be selected because historical information 116 may indicate the bandwidth is lower in recent playback sessions, rebuffering has recently occurred, or the roundtrip time is longer. If bandwidth is lower than 2400k Mbps, the selection of Profile #1 may result in a non-optimal playback of a segment. For example, there may be a delay in downloading the initial segment and a delay in the starting of playback of the video. This may result in the canceling of the playback of the video by a user due to the slow start up time or even a failure may result due to a time out in starting playback. However, selecting profile #4 with a bitrate of 800k Mbps may be more appropriate for the bandwidth that has been recently experienced by client device 104 and may continue to be experienced in this session. This may result in an acceptable download time and playback start for the initial segment. Also, if being used during the playback session, the profile that is selected may be more appropriate for the playback conditions being experienced. In some embodiments, after downloading the initial segment or one or more segments, adaptive bitrate algorithm 114 may transition to selecting a profile using the bandwidth that is calculated based on the downloading of segments in the current playback session. For example, if the last X segments are downloaded with a 2400 Mbps bandwidth, adaptive bitrate algorithm 114 may select Profile #1 for downloading a next segment. In some embodiments, adaptive bitrate algorithm 114 may still use historical information 116 to select the next profile. For example, adaptive bitrate algorithm 114 may select Profile #2 for the segment because historical information 116 indicated that the variance of bandwidth was higher.

Some other parameters may be used to select the profile. If the stored variance of bandwidth or roundtrip is large, which indicates that the user's bandwidth is not stable, in the next session the second logic should select a lower bitrate. Also, the isLive parameter can be used to distinguish video on demand and Live conditions.

Conclusion

Accordingly, the decisions to select profiles by adaptive bitrate algorithm 114 may be improved using historical information 116. This may result in the playback experience at client 104 being improved, where less rebuffers may occur and playback startup may be faster and smoother.

System

Figure 6:
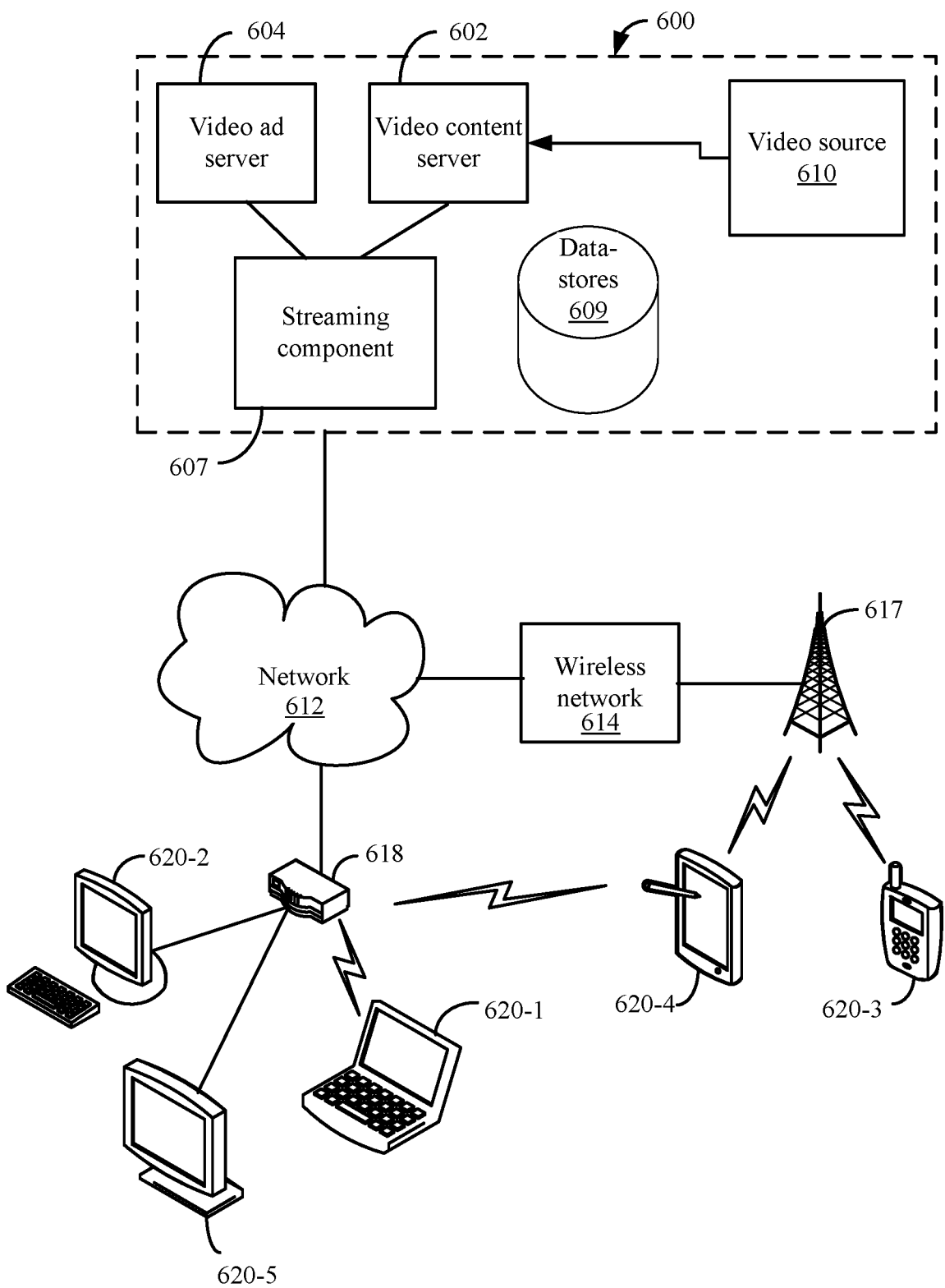
FIG. 6 depicts a video streaming system in communication with multiple client devices via one or more communication networks according to one embodiment.

Features and aspects as disclosed herein may be implemented in conjunction with a video streaming system 600 in communication with multiple client devices via one or more communication networks as shown in FIG. 6. Aspects of the video streaming system 600 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 600, video data may be obtained from one or more sources for example, from a video source 610, for use as input to a video content server 602. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 600 may include one or more computer servers or modules 602, 604, and 607 distributed over one or more computers. Each server 602, 604, 607 may include, or may be operatively coupled to, one or more data stores 609, for example databases, indexes, files, or other data structures. A video content server 602 may access a data store (not shown) of various video segments. The video content server 602 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 604 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 600, a public service message, or some other information. The video advertising server 604 may serve the video advertising segments as directed by a user interface controller (not shown).

The video streaming system 600 may further include an integration and streaming component 607 that integrates video content and video advertising into a streaming video segment. For example, streaming component 607 may be a content server or streaming media server. A controller (not shown) may determine the selection or configuration of advertising in the streaming video based on any suitable algorithm or process. The video streaming system 600 may include other modules or units not depicted in FIG. 6, for example, administrative servers, commerce servers, network infrastructure, advertising selection engines, and so forth.

The video streaming system 600 may connect to a data communication network 612. A data communication network 612 may comprise a local area network (LAN), a wide area network (WAN), for example, the Internet, a telephone network, a wireless network 614 (e.g., a wireless cellular telecommunications network (WCS)), or some combination of these or similar networks.

One or more client devices 620 may be in communication with the video streaming system 600, via the data communication network 612, wireless network 614, or another network. Such client devices may include, for example, one or more laptop computers 620-1, desktop computers 620-2, "smart" mobile phones 620-3, tablet devices 620-4, network-enabled televisions 620-5, or combinations thereof, via a router 618 for a LAN, via a base station 617 for wireless network 614, or via some other connection. In operation, such client devices 620 may send and receive data or instructions to the system 600, in response to user input received from user input devices or other input. In response, the system 600 may serve video segments and metadata from the data store 609 responsive to selection of media programs to the client devices 620. Client devices 620 may output the video content from the streaming video segment in a media player using a display screen, projector, or other video output device, and receive user input for interacting with the video content.

Distribution of audio-video data may be implemented from streaming component 607 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth, and structure of those files, delivers just the amount of data necessary to play the video, at the rate needed to play it. Streaming media servers may also account for the transmission bandwidth and capabilities of the media player on the destination client. Streaming component 607 may communicate with client device 620 using control messages and data messages to adjust to changing network conditions as the video is played. These control messages can include commands for enabling control functions such as fast forward, fast reverse, pausing, or seeking to a particular part of the file at the client.

Since streaming component 607 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 607 may use TCP-based protocols, such as HyperText Transfer Protocol (HTTP) and Real Time Messaging Protocol (RTMP). Streaming component 607 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 7:
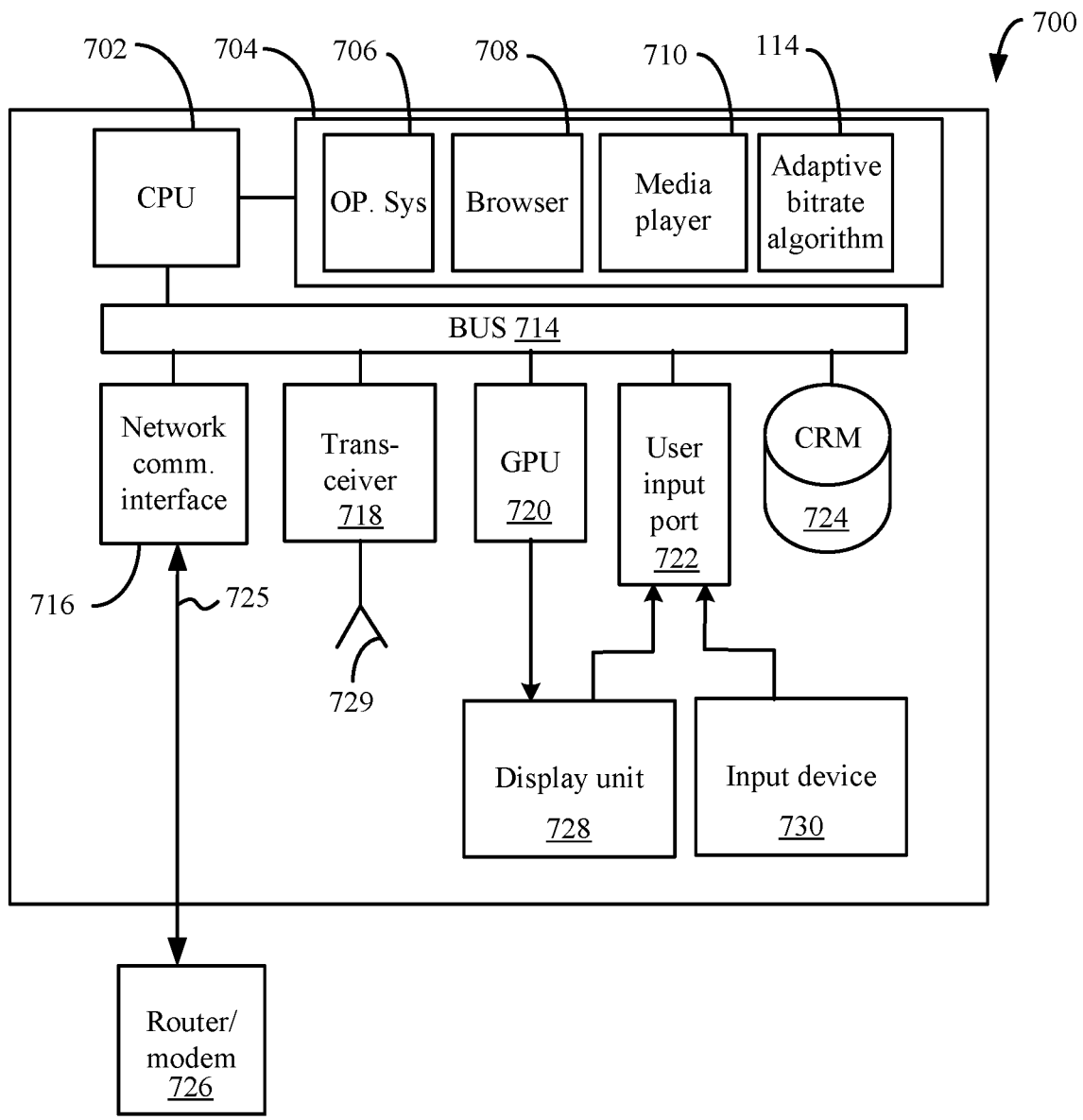
FIG. 7 depicts a diagrammatic view of an apparatus for viewing video content and advertisements.

Referring to FIG. 7, a diagrammatic view of an apparatus 700 for viewing video content and advertisements is illustrated. In selected embodiments, the apparatus 700 may include a processor (CPU) 702 operatively coupled to a processor memory 704, which holds binary-coded functional modules for execution by the processor 702. Such functional modules may include an operating system 706 for handling system functions such as input/output and memory access, a browser 708 to display web pages, and media player 710 for playing video. The modules may further include adaptive bitrate algorithm 114. The memory 704 may hold additional modules not shown in FIG. 7, for example modules for performing other operations described elsewhere herein.

A bus 714 or other communication components may support communication of information within the apparatus 700. The processor 702 may be a specialized or dedicated microprocessor configured or operable to perform particular tasks in accordance with the features and aspects disclosed herein by executing machine-readable software code defining the particular tasks. Processor memory 704 (e.g., random access memory (RAM) or other dynamic storage device) may be connected to the bus 714 or directly to the processor 702, and store information and instructions to be executed by a processor 702. The memory 704 may also store temporary variables or other intermediate information during execution of such instructions.

A computer-readable medium in a storage device 724 may be connected to the bus 714 and store static information and instructions for the processor 702; for example, the storage device (CRM) 724 may store the modules for operating system 706, browser 708, and media player 710 when the apparatus 700 is powered off, from which the modules may be loaded into the processor memory 704 when the apparatus 700 is powered up. The storage device 724 may include a non-transitory computer-readable storage medium holding information, instructions, or some combination thereof, for example instructions that when executed by the processor 702, cause the apparatus 700 to be configured or operable to perform one or more operations of a method as described herein.

A network communication (comm.) interface 716 may also be connected to the bus 714. The network communication interface 716 may provide or support two-way data communication between the apparatus 700 and one or more external devices, e.g., the streaming system 600, optionally via a router/modem 726 and a wired or wireless connection 725. In the alternative, or in addition, the apparatus 700 may include a transceiver 718 connected to an antenna 729, through which the apparatus 700 may communicate wirelessly with a base station for a wireless communication system or with the router/modem 726. In the alternative, the apparatus 700 may communicate with a video streaming system 600 via a local area network, virtual private network, or other network. In another alternative, the apparatus 700 may be incorporated as a module or component of the system 600 and communicate with other components via the bus 714 or by some other modality.

The apparatus 700 may be connected (e.g., via the bus 714 and graphics processing unit 720) to a display unit 728. A display 728 may include any suitable configuration for displaying information to an operator of the apparatus 700. For example, a display 728 may include or utilize a liquid crystal display (LCD), touchscreen LCD (e.g., capacitive display), light emitting diode (LED) display, projector, or other display device to present information to a user of the apparatus 700 in a visual display.

One or more input devices 730 (e.g., an alphanumeric keyboard, microphone, keypad, remote controller, game controller, camera, or camera array) may be connected to the bus 714 via a user input port 722 to communicate information and commands to the apparatus 700. In selected embodiments, an input device 730 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 728, for example using a touch sensitive screen. A cursor control device may communicate direction information and command selections to the processor 702 and control cursor movement on the display 728. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   determining whether to select a computing device, first logic that selects a profile from a list of profiles to use to download a segment in a playback session for content without using historical information or second logic to select the profile using the historical information;
   selecting, by the computing device, the second logic during the playback session;
   selecting, by the computing device, historical information from one or more previous playback sessions from the playback session;
   determining, by the computing device, a bandwidth using the historical information; and
   selecting, by the computing device, the profile to use to download the segment using a bitrate that is determined based on the bandwidth.

2. The method of claim 1, wherein determining whether to select the first logic or the second logic comprises:
   using a setting that indicates whether to select the second logic.

3. The method of claim 1, wherein determining whether to select the first logic or the second logic comprises:
   determining whether a context of the historical information has expired; and
   selecting the first logic to use when the context of the historical information has expired.

4. The method of claim 1, wherein the playback session comprises a first playback session, the method further comprising:
   selecting the first logic during a second playback session; and
   selecting, using the first logic, the profile to use to download the segment without using the historical information.

5. The method of claim 4, wherein when using the first logic, selecting the profile as a first profile that is listed in the list of profiles.

6. The method of claim 4, wherein when using the first logic, selecting the profile using fixed settings that did not change for the first logic from a last playback session.

7. The method of claim 4, wherein when using the first logic, selecting a bitrate from a first profile that is listed in the list of profiles.

8. The method of claim 1, further comprising:
   determining a setting for a type of historical information; and
   selecting the historical information from the type of historical information.

9. The method of claim 8, wherein:
   the type of historical information comprises a plurality of types of historical information, and
   the type of historical information is selected based on which type of historical information in the plurality of types of historical information is ranked highest.

10. The method of claim 8, wherein:
    the type of historical information is selected from a last type that is based on historical information from a last segment of a previous playback session, an estimated type that is based on an estimated value of historical information from a previous playback session, and a recent type that is based on historical information that is averaged over a time period.

11. The method of claim 1, wherein:
    the historical information comprises a bandwidth and a roundtrip time.

12. The method of claim 11, wherein:
    a first type of historical information comprises an estimated bandwidth of a previous session and an estimated roundtrip time of the previous session,
    a second type of historical information comprises a last observed bandwidth of a segment of the previous session and the estimated roundtrip time of the previous session, and
    a third type of historical information comprises a recent bandwidth of a time period and a recent roundtrip time of the time period.

13. The method of claim 1, further comprising:
    adjusting the bandwidth using a safe factor, wherein the safe factor is used to reduce the bandwidth.

14. The method of claim 1, further comprising:
    determining whether a rebuffer occurred in the historical information; and
    adjusting the bandwidth based on a value when the rebuffer occurred.

15. The method of claim 1, further comprising:
    setting a target bitrate as the bandwidth;
    determining whether to use a roundtrip time to adjust the bandwidth;
    when using the roundtrip time, adjusting the target bitrate based on the roundtrip time to generate an adjusted target bitrate; and
    using the adjusted target bitrate to select the profile.

16. The method of claim 1, wherein the historical information is stored locally at a device that is selecting the profile.

17. A non-transitory computer-readable storage medium having stored thereon computer executable instructions, which when executed by a computing device, cause the computing device to be operable for:
    determining whether to select first logic that selects a profile from a list of profiles to use to download a segment in a playback session for content without using historical information or second logic to select the profile using the historical information;
    selecting the second logic during the playback session;
    selecting historical information from one or more previous playback sessions from the playback session;
    determining a bandwidth using the historical information; and
    selecting the profile to use to download the segment using a bitrate that is determined based on the bandwidth.

18. The non-transitory computer-readable storage medium of claim 17, wherein determining whether to select the first logic or the second logic comprises:
- determining whether a context of the historical information has expired; and
- selecting the first logic to use when the context of the historical information has expired.

19. The non-transitory computer-readable storage medium of claim 17, wherein when using the first logic, selecting the profile as a first profile that is listed in the list of profiles.

20. The non-transitory computer-readable storage medium of claim 17, wherein the playback session comprises a first playback session, further operable for:
- selecting the first logic during a second playback session; and
- selecting, using the first logic, the profile to use to download the segment without using the historical information.

21. An apparatus comprising:

one or more computer processors; and a computer-readable storage medium comprising instructions for controlling the one or more computer processors to be operable for:

determining whether to select first logic that selects a profile from a list of profiles to use to download a segment in a playback session for content without using historical information or second logic to select the profile using the historical information;

selecting the second logic during the playback session;

selecting historical information from one or more previous playback sessions from the playback session;

determining a bandwidth using the historical information; and selecting the profile to use to download the segment using a bitrate that is determined based on the bandwidth.

* * * * *